J. N. Bolles,
Boring Artesian Wells.
No. 4,837. Reissued Dec. 20, 1864.
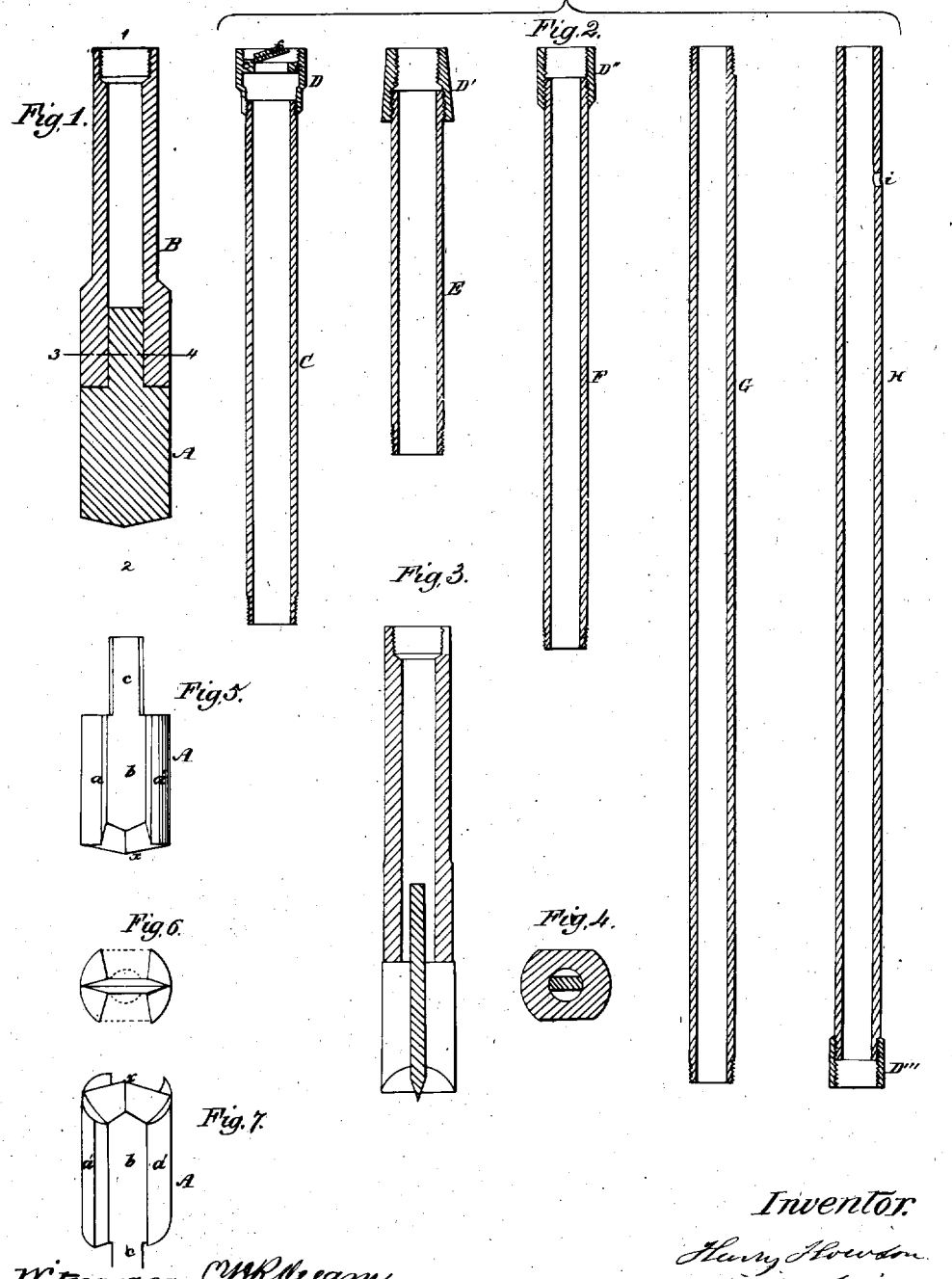
Witnesses. C. H. Creamy
Wm. Albert Seal
Inventor.
Henry Howson
Atty. for the Assignee

UNITED STATES PATENT OFFICE.

HENRY HANNEN AND JOHN PARKER, OF PHILADELPHIA, PENNSYLVANIA, ASSIGNEES, BY MESNE ASSIGNMENTS, OF JESSE N. BOLLES.

IMPROVEMENT IN APPARATUS FOR BORING ARTESIAN WELLS.

Specification forming part of Letters Patent No. 17,064, dated April 14, 1857; Reissue No. 1,837, dated December 20, 1864.

*To all whom it may concern:*

Be it known that we, HENRY HANNEN and JOHN PARKER, of Philadelphia, Pennsylvania, are the owners of certain Letters Patent for Improvement in Apparatus for Boring Artesian Wells, granted to M. W. BOLLES (assignee of JESSE N. BOLLES) on the 14th day of April, A. D. 1857; that we deem the said patent inoperative and invalid by reason of a defective specification, and that the following is a full, clear, and exact description of the said invention.

The invention of the said BOLLES consists, first, in combining with a rock drill or cutter certain tubular rods through which the detritus is caused to pass upward and to be discharged at the point desired; secondly, in a valve or valves arranged within the said tubular drill-rods, for the purpose of raising the detritus; thirdly, in a drill or cutter constructed substantially as described hereinafter.

In order to enable others skilled in the art to make and use this invention, we will now proceed to describe its construction and operation.

On reference to the accompanying drawings, which form a part of this specification, Figure 1 is a section of a portion of a tubular drill-rod with the drill attached; Fig. 2, sections of the tubes composing the remainder of the drill-rod; Fig. 3, a section on the line 1 2, Fig. 1; Fig. 4, a transverse section on the line 3 4, Fig. 1; Fig. 5, an exterior view of the drill; Fig. 6, an inverted plan view of the same, and Fig. 7 a perspective view of the drill inverted.

Similar letters refer to similar parts throughout the several views.

A is a steel cutter or drill, which consists of the two portions *a a'* of a cylinder, sharpened at their ends so as to form two curved cutting-edges, the two parts being united by a cross-piece, *b*, the edge of which is also sharpened and brought to a point, *x*, the latter projecting to the extent of half an inch, or thereabout, beyond the edges of the portions *a a'*. The cross-piece *b* of the drill should be about two inches wide and three-fourths of an inch thick, and near the cutting-edge it is beveled more or less, as required, the shank *c* of the drill being also three-fourths of an inch thick, and of such a width as to fit into the bore of the tubular drill-stock B, Fig. 1, which is two inches in diameter, there being, consequently, a space between the inside of the drill-stock and the shank *b*, on each side of the latter, as best shown in Fig. 4. The drill-stock B, to which the drill is secured in any suitable manner, is made in part of extra-heavy wrought-iron gas-pipe, three or four feet long, and in part of cast-iron, shrunk on the gas-pipe for about twenty inches, at the lower end, two of the sides being rounded to correspond with the rounded portions *a a'* of the cutter, while the other two sides are flattened and parallel with each other, as shown in Fig. 4. Upon the inside of the upper end of the drill-stock is cut a deep thread corresponding with a similar thread on the lower end of a wrought-iron gas-pipe, C, in the upper end of which is a coupling, D, containing a brass valve-seat, *e*, and to the latter is hinged an ordinary valve, *f*.

On the lower end of the tube E is a thread adapted to that in the coupling D, and on the upper end of the tube is a reducing-coupling, D', with internal threads adapted to those on the end of the tube E.

The tubes F, G, and H, which constitute the main drilling-rods, are made of wrought-iron gas-pipe, extra heavy, one and one-half inch in diameter, and are connected together by wrought-iron sockets or couplings D'', about four inches long, one-fourth of an inch thick, and tapped slightly tapering, so as to bring the rods nearly together. The screw-joints should be kept perfectly tight, when the machine is in operation, by turning the rods in the direction of the screws. Near the upper end of the tube H is an opening, *i*, for a purpose described hereinafter.

The tubes may be from five to fourteen feet in length, and the sockets or couplings, as well as the tubes, should be placed in a lathe, so that the threads may be perfectly cut.

The screws should be slightly tapering, so that the tubes, where they are coupled together, may be self-tightening on being turned round in the proper direction.

The tubes should not be allowed to butt together, the joints being made with precision, so that when the various parts are connected they will form a perfectly straight, continuous, hollow drill-rod.

Although the apparatus may be operated by mechanism of various kinds, we prefer attaching it to the rock-drilling machine for which a patent was granted to Bolles and McKnight, May 1, 1849, which raises the rod six inches at each stroke, and about sixty times per minute.

While the rock is mainly broken by the cutting-edge of the portion *b* of the drill, the cutting-edges of the portions *a a'* serve to make the opening perfectly round and even.

After the machine is set in motion the detritus and water in the well gradually fill the hollow tubes and are raised by the action of the latter and the valve *f*, until discharged through the opening *i*, or through openings made in any of the tubes at any desired point.

It will be seen that by the use of the hollow drill-rods the detritus is constantly raised from the well during the operation of the drill, and that the labor and delay heretofore necessarily incurred in withdrawing the tubes in order to remove the detritus is thus avoided.

By examining the character of the detritus discharged, the attendant is enabled to ascertain whether the drill requires sharpening, without withdrawing the latter from the well.

Should it be found necessary, the valve *f* may be placed directly above the cutter A, or in any other position desired, and, if deemed necessary, an additional number of valves may be used.

By extending the sides of the portions *a a'* of the cutter beyond those of the central cross-piece, *b*, a space or chamber is formed at each side of the latter which directs the detritus into the opening of the tubular drill-stock.

Although certain dimensions have been given for the several parts of the apparatus, it will be evident that these dimensions may be varied to suit the size of the well to be bored.

We claim as the invention of the said J. N. BOLLES and desire to secure by Letters Patent—

1. The combination of a drill or cutter, A, with tubular rods, through which the detritus is caused to pass upward, and to be discharged at the point desired, substantially as specified.

2. One or more valves, *f*, arranged within the tubular drill rods of a well-boring machine, substantially as and for the purpose set forth.

3. The drill or cutter A, composed of the portions *a a'* and cross-piece *b*, constructed and arranged substantially as and for the purpose set forth.

In testimony whereof we have signed our names to this specification before two subscribing witnesses.

HENRY HANNEN.
JOHN PARKER.

Witnesses:
CHARLES E. FOSTER,
JOHN WHITE.